INVENTOR.
NICHOLAS N. STEPHANOFF
BY
ATTORNEY ature:#United States Patent Office 3,329,418
Patented July 4, 1967

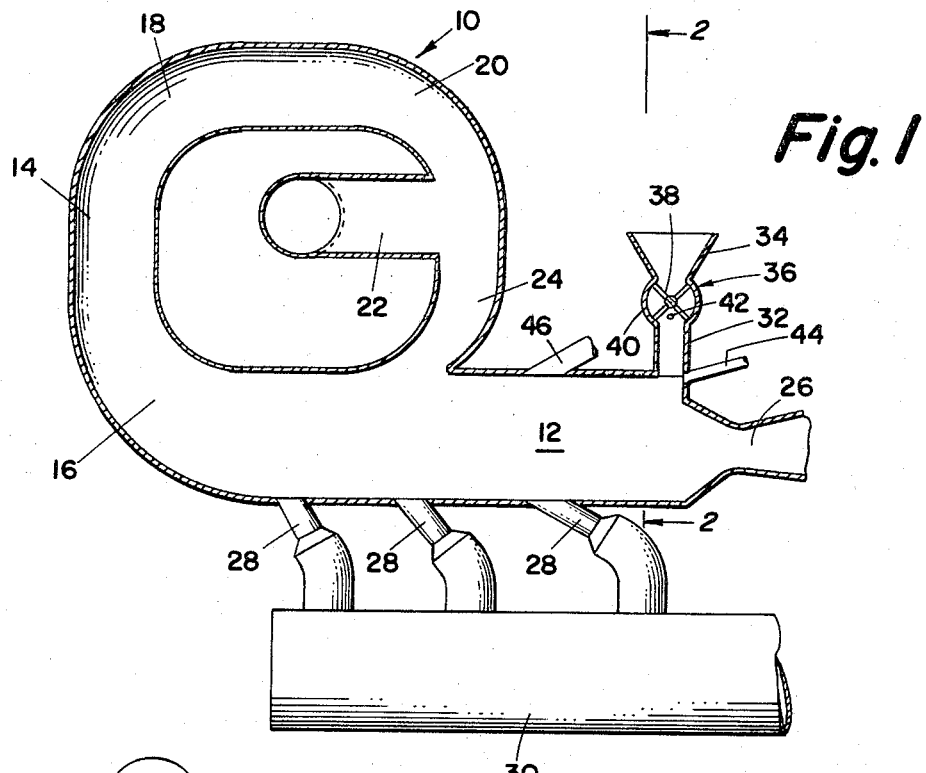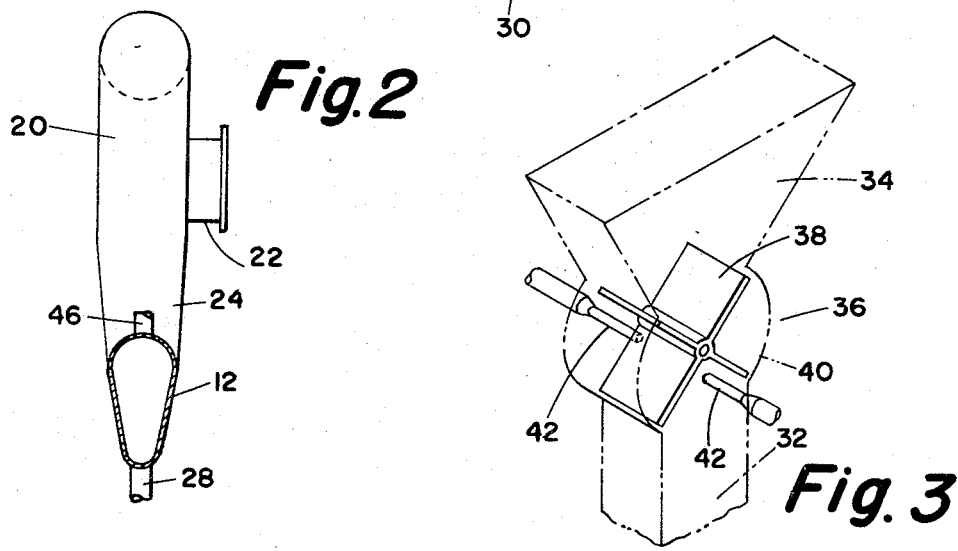

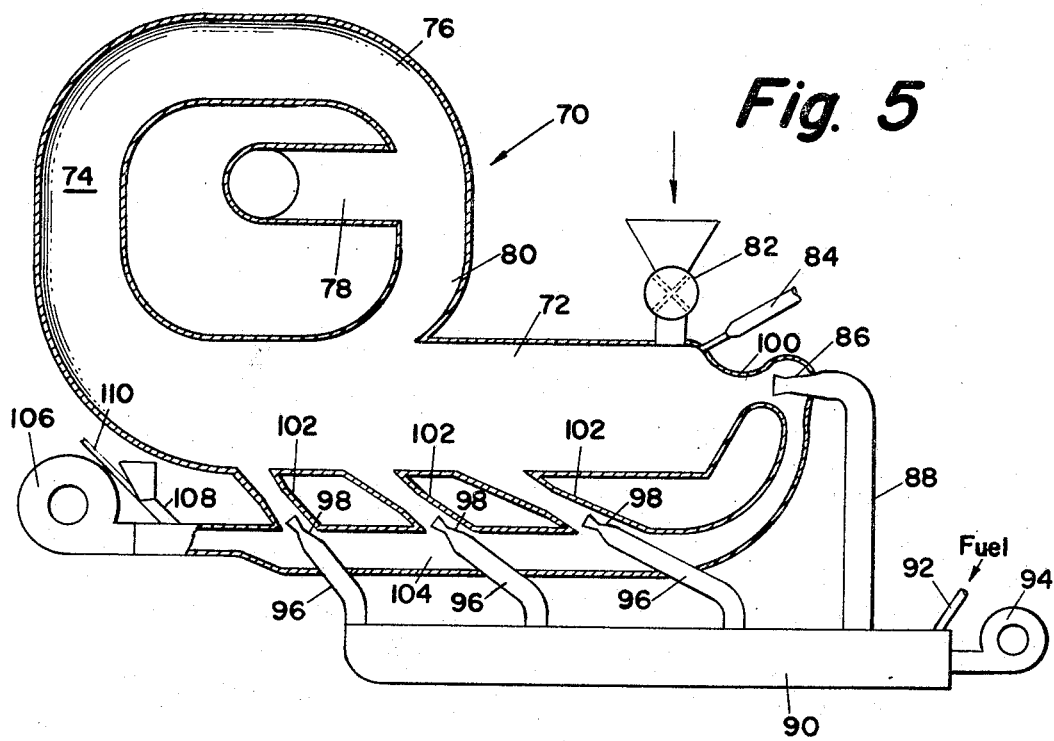
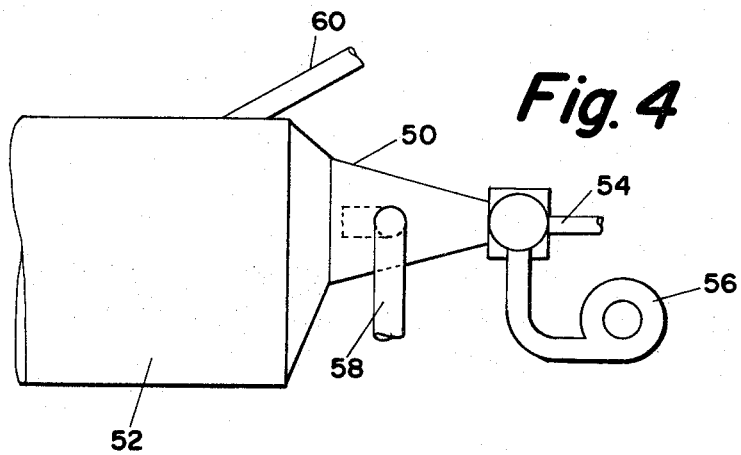

3,329,418
APPARATUS FOR TREATING WET SOLID AND SEMI-SOLID MATERIALS IN A FLUID STREAM
Nicholas N. Stephanoff, Haverford, Pa., assignor to Fluid Energy Processing & Equipment Company, Lansdale, Pa., a corporation of Pennsylvania
Filed Mar. 30, 1965, Ser. No. 443,921
9 Claims. (Cl. 263—21)

This investment relates to a method and apparatus for treating wet solid and semi-solid materials, and it particularly relates to the treatment of materials that tend to agglomerate when wet.

Many granular materials that are in an initial wet state are extremely tacky and the particles thereof tend to form chunks and cakes which quickly harden into brick-like agglomerates. These bricks, when partially dried, have extremely hard, dense outer layers, and it is very difficult to complete the drying of their interiors because it is difficult for heat to permeate them. This is an especial problem in those cases where excessive heat would melt or otherwise deleteriously affect the substantially dry material of the outer layers.

Attempts to first pulverize this agglomerated material and then dry it have met with indifferent success because not only does this require two separate operations but, in many cases, the pulverized particles retain sufficient moisture during the pulverization process to keep them wet but not enough to prevent them from quickly deteriorating when exposed to the high temperatures required for the drying. Furthermore, the hardness and density of the outer layers of the bricks make it difficult to break the material into sufficiently fine particle size to permit effective utilization of the drying heat.

It is one object of the present invention to overcome the above difficulties by providing an apparatus to effectively and efficiently dry wet, tacky solid and semi-solid materials while preventing both agglomeration and deterioration of the material.

Another object of the present invention is to provide an apparatus of the aforesaid type adapted for additional simultaneous treatments of the material such as reduction, oxidation, calcining, coating, impregnating, chemical reaction, and the like.

Other objects and many of the attendant advantages of this invention will be readily appreciated as the same becomes better understood by reference to the following description when read in conjunction with the accompanying drawings wherein:

FIG. 1 is a side view, partly in section and partly in elevation, of an apparatus embodying the present invention.

FIG. 2 is a sectional view taken on line 2—2 of FIG. 1.

FIG. 3 is an enlarged, detailed, perspective view of the feed means shown in FIG. 1.

FIG. 4 is a fragmentary, elevational view of a modified form of the invention.

FIG. 5 is a side view, partly in section and partly in elevation, or another embodiment of the invention.

Figure 6:
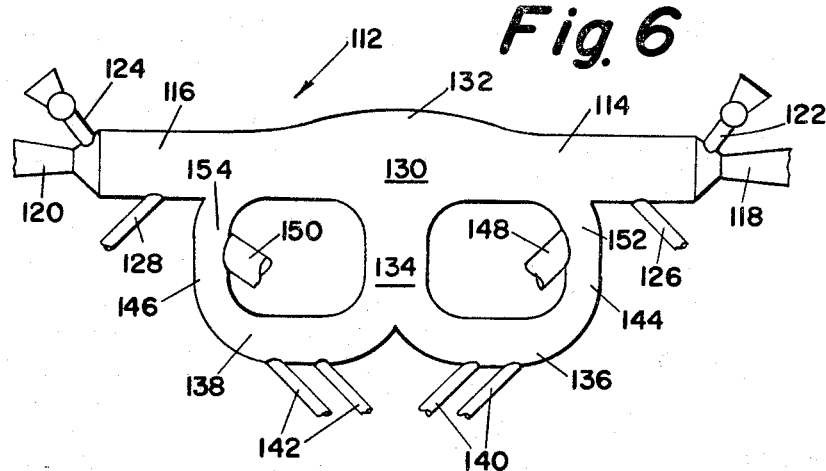
FIG. 6 is a side elevational view of yet another modified from of the invention.

Referring now in greater detail to the various figures of the drawings wherein similar reference characters refer to similar parts, there is shown a mill, generally designated 10, comprising a straight inlet section 12 of generally trapezoidal cross-section (as best shown in FIG. 2) with the upper portion being arcuate and relatively large and the lower portion being arcuate but relatively small. The inlet section 12 leads into an upstack section 14 through an arcuate elbow portion 16. The elbow portion 16 is of generally circular cross-section and gradually narrows in diameter from a lower end of substantially the same diameter as the vertical diameter of the inlet section 12 to an upper end of the same diameter as that of the upstack section 14 which is also of generally circular cross-section. The upstack section 14 leads through an arcuate elbow portion 18 into a generally arcuate classifier section 20. The classifier section 20 is also of gradually decreasing circular cross-section and is provided with an exhaust duct 22 situated just above the area where the classifier section merges into a return section 24 which is also generally circular in cross-section and is of further diminishing diameter as it leads arcuately back into the top of the inlet section 12.

At the rear end of the inlet section 12 is provided a Venturi-type nozzle 26 leading from a source of hot, low pressure gas. At least one, but preferably a plurality of other nozzles 28 lead into the bottom of the inlet section 12 from a manifold or header 30. The header 30 may be connected to a source of hot, low pressure gas or it may, itself, be a combustion chamber to generate such gas. The nozzle 26 can, furthermore, be connected to the header 30 or to a common source of hot gas, or it may be connected to a separate source.

The nozzles 28 enter the section 12 diagonally or tangentially so that the gases issuing therefrom generate a fluid vortex in the section 12. The nozzles 28 are also preferably of the abrupt type whereby acoustic or lower velocities and high turbulence is obtained. However, if desired, they may be of the so-called convergent-divergent type whereby superacoustic velocities with less turbulence are obtained.

The material for which this apparatus is especially suitable is, as mentioned above, material which, when wet, is tacky and tends to clump up or agglomerate into hard bricks. Such type of material is preferably fed into the apparatus through a feed duct 32 having a hopper 34 at its upper end and a plural-bladed rotary valve assembly 36 interposed in the duct just below the hopper. The tacky clumps of material fed into the hopper 34 are crushed by the rotary motion of the valve blades 38 within the valve housing 40, and the crushed material is then passed through the duct 32. Preferably a plurality of small, high pressure jet nozzles 42, connected to a source of fluid pressure (not shown) are mounted on the valve housing 40 to eject sprays of a high pressure fluid, such as air, against the valve blades in order to clean them of adhering tacky substances. The blades 38 also act as movable sealing means for the feed duct.

The rotary valve blades are mounted on a shaft which may be manually operated or which may be operatively connected to a motor or other drive means which may, optionally, also be used to actuate valve means (not shown) to provide intermittent operation of the jet sprays in synchronism with the rotation of the valve blades so that the spray would be actuated only when the valve blades are in position to be cleaned.

As the crushed material falls through the feed duct 32 into the section 12 of the mill, it is dispersed by a stream of high pressure gaseous fluid issuing from a dispersing nozzle 44 connected to a source of high pressure elastic fluid (not shown). The dispersed material is then entrained in the hot, low pressure gas issuing from the nozzle 26. This hot gas rapidly effects a substantial drying of the material while projecting it forwardly along the straight inlet section 12.

The inlet section 12 is made of a length sufficient to permit enough drying of the material to eliminate tackiness and thereby prevent adhesion of the material to the far end of the section. For similar reasons, the section 12 is provided with the aforementioned trapezoidal cross-sectional shape, because, by this arrangement, the material, if still tacky is kept away from the outwardly inclining sides of the section 12. Furthermore, the nozzles 28 are preferably provided at the bottom of the section 12 so that if there is only a relatively small amount of material being processed, such material will be concentrated in the smaller cross-sectional area of the lower portion where it will be subject to the full effect of the fluid from the nozzles 28. Nevertheless, if it is desired to subject all parts of the material to the fluid action, especially when a relatively large amount is being processed, one or more tangential nozzles, such as shown at 46, are provided at the top or even at the sides of the inlet section 12.

In operation, the tacky material is fed through the valve 36 and through the duct 32 and is then dispersed by the fluid from nozzle 44. The dispersed material is then substantially flash-dried by the hot gases issuing from the nozzle 26 and simultaneously projected by these hot gases longitudinally of the inlet section 12. As the material passes through the inlet section 12, it mixes with the fluid vortex formed by the fluid issuing from nozzles 28 and, if desired, from nozzles 46. This fluid vortex not only circulates in a helical path but also moves longitudinally of the section 12 because of the initial impetus of the gas from nozzle 26 and the angular direction of the nozzles 28 and 46.

As the fluid vortex and the solid particles move through the upstack and into the classifier section, additional drying takes place. The force of linear momentum of the particles and the force of the outward fluid flow tend to carry the particles to the outer portion of the arcuate mill sections. Due to centrifugal force, the wetter, heavier particles tend to travel in such outer position until sufficiently dry and light to permit the viscosity of the suspending fluid flowing inwardly along the surfaces of the mill to overcome the centrifugal force and entrain the particles therein. The upstack and classifier sections are of less diameter than the inlet section 12 or elbow portion 16 because the relatively greater dryness of the particles results in less volume occupied thereby.

As the vortex continues around to the classifier section, the lighter particles entrained in the inner portion of the vortex pass out through the exhaust duct 22 to a collection station or further treating station (not shown) while the heavier particles, which may still have some moisture adhering thereto, pass back through the return section into the upper portion of the inlet section 12 but spaced from the high heat area adjacent the nozzle 16.

During the passage of the vortex gases through the upstack, classifier and return sections, the vortex gases lose much heat. They, therefore, are cooler than the hot gases passing into the inlet section from the nozzles 26, 28 and 46. Consequently, they act as tempering means for the recycled particles re-entering the inlet section. This is important because when the very wet, tacky particles are initially fed into the mill, even though the temperature of the hot gases may exceed the melting or deterioration temperature of the solid particles, this heat is used up in the evaporation of the adherent liquid. However, the recycled particles are so very nearly dry that such high temperature would melt or damage them. The distance of the return duct from the entrance portion and the tempering effect of the relatively cool return gases prevent such deterioration.

Although the particular feed means illustrated at 32, 34 and 36 is preferable for relatively tacky materials, other feed means such as a screw-feed, a Venturi nozzle, etc. may be substituted where desirable or feasible. Furthermore, the dispersing nozzle 44 may be omitted if the material being processed is such that a dispersing action is not required.

An example of the type of material which may be effectually processed by the above-described apparatus is crumb rubber. Crumb rubber is formed from a liquid latex slurry. The crumb rubber so produced is generally in the form of chunks of about ⅜ to ½ inch diameter. These chunks are wet and it is very difficult to remove all traces of moisture therefrom because of the adherence of the particles to each other and because moisture from the interior of the chunks cannot be squeezed through the impervious outer shell that forms around the chunks. Attempts were made to pulverize or grind the chunks into relatively fine particles and then to dry the fine particles. However, this not only required a two-stage operation, namely pulverizing and then drying, but it also caused deterioration of the rubber because so much moisture was lost during the pulverization process that, although still relatively wet, when temperatures high enough to effectuate adequate drying were used, the rubber itself began to deteriorate, such deterioration setting in at temperatures as low as about 200° F.

Another material effectively processed in this manner is calcium stearate. This material is extremely tacky even with as much as 62% water. The above-described apparatus, especially with the rotary valve feed means, has been most effectively used to dry this material which is ordinarily extremely difficult to handle.

Other materials effectively processed in this manner are synthetic resins of various types and even vegetables, meats and other foods.

Utilizing the apparatus of the present invention, not only is prior fine pulverization not required, but temperatures considerably in excess of the melting or other deterioration temperatures can be used to effect a substantial immediate flash-drying because of the so-called "wet-bulb" effect, whereby the heat energy is used for evaporation before it can effect deterioration of the rubber.

Although hot, low pressure gases are preferably passed through the nozzles 28 and 46, it may be desirable to use cooler gases when the materials treated are capable of withstanding only relatively low temperatures after the initial flash-drying by the gases entering from nozzle 26. Alternatively, the nozzles 28 and 46 may be used for the passage of gases at high pressure or of gases at high velocities. Such high velocity gases would be preferable in those cases where it was more desirable to effect a grinding or pulverization in this portion of the apparatus rather than a secondary drying.

The above-described apparatus is also adapted for use in processes other than dehydrating or drying. For example, it can be used for oxidizing the granular material by simply injecting oxygen or air through the nozzles 28 and 46.

Conversely, the apparatus can be used for reduction, as for example, by the introduction of hydrogen through the nozzles. Illustrative of this reduction process, finely divided $Cr_2O_3$ (chrome ore) is introduced into the mill through the duct 32 and hydrogen is introduced through the nozzles 26, 28 and 46, preferably at a temperature of at least 1300° C. (but below the melting point of chrome metal which is about 1830° C.).

Alternatively, gaseous substances which are chemically reactive with the fed material may be inserted through the nozzles, or chemically reactive substances may be introduced through some of the nozzles while catalysts or other chemically reactive substances may be introduced through other of the nozzles.

The above-described apparatus is also adapted for calcining the fed material and FIG. 4 shows a modification wherein all the parts of the apparatus are similar to that of FIG. 1 except that instead of the nozzle 26, there is provided a combustion chamber 50 which fits on the rear end of the inlet section 52 that is otherwise generally the same as inlet section 12. The combustion chamber 50 is fed with fuel, such as gas or oil, through the inlet 54 and is provided with a blower fan 56 for inserting the air used in the combustion. A duct 58 is optionally provided for connection to a source of low pressure air (not shown). This air can be used to dilute the hot combustion gases to both lower the temperature and velocity thereof if this should be desirable.

Very high temperatures can be produced in the straight inlet section 52 with this combustion chamber arrangement, such temperatures ranging up to 3000° F. or higher. This permits the use of the apparatus for calcining many different types of material which may be fed through the inlet duct shown at 60. Of course, a valved inlet means such as shown in FIG. 1 may be substituted for the duct 60 as may any of the other feasible types such as screw-feed means, Venturi means, etc. A dispersing means, similar to that shown at 44, may also be used.

If desired, the combustion chamber 50 can be eliminated and a plasma flame substituted. It is also possible to substitute a combustion chamber for the header, such as shown at 30 in FIG. 1, which feeds the tangential nozzles. In such case, a duct could lead directly from the combustion chamber into the rear end of the inlet section 52. An arrangement of this general nature, but with additional features, is illustrated in FIG. 5.

The apparatus of FIG. 5 comprises a mill, generally designated 70, which is similar to that of FIG. 1 in that it includes the same type of inlet section, here designated 72, and the same type of upstack, classifier, exhaust and return sections, here designated respectively as 74, 76, 78 and 80. The same type of valved feed means and dispersing means are shown respectively at 82 and 84. At the rear end of the inlet section 72 is provided an opening in which is positioned a nozzle 86. This nozzle 86 is of the convergent-divergent type which emits a jet of fluid at superacoustic velocity, and is connected through duct 88 to a pressurized combustion chamber 90 having a fuel inlet 92 and a blower 94. Also connected to the combustion chamber 90 are a plurality of ducts 96 having convergent-divergent jet nozzles 98 tangentially positioned relative to the bottom of inlet section 72.

The convergent-divergent nozzles are the so-called De Laval type wherein the forward portion is smoothly converging toward a relatively narrow central passage and then smoothly diverging. This provides superacoustic velocities of the fluid which is ejected in the form of a jet. Since the fluid comprises the hot combustion gases issuing from the combustion chamber 90, the velocity is similar to that of a jet engine.

In order to give more body to the hot combustion gases issuing from nozzles 86 and 98 and in order to cool these gases, where necessary, the nozzle 86 as well as each nozzle 98 is encompassed by a Venturi passage, such a Venturi passage for nozzle 86 being designated 100 and for the nozzles 98 being designated 102. The Venturi passages 100 and 102 are individually connected to a manifold or header 104 which is supplied with a blower 106 connected to a source of room temperature air or the like (not shown). In some instances, the blower fan may be omitted and only the suction from the Venturi passage utilized. As this air passes through the Venturi passages, they are sucked into the hot fluid jets issuing from their corresponding jet nozzles 86 or 98. Since many materials would deteriorate or melt at the very high temperatures of the combustion gases (in some cases, over 4000° F.), the cooling air or other gas is important since, in this manner, it is still possible to utilize the high energy of the hot combustion gases while, at the same time, making them sufficiently cool to prevent damage to the material being treated.

The apparatus of FIG. 5 can also be used to intermix any other desired material with the hot combustion gases, whether for chemical reaction or any other process. For this purpose, a feed inlet 108 is provided for the header 104. The feed means illustrated includes the inlet duct plus a fluid-pressure nozzle 110, connected to a source of pressure fluid (not shown) for dispersing and conveying the material into the header. Any other feasible type of feed means can, however, be substituted.

The material inserted through feed means 108 is carried along by the cooling gas and ejected through the Venturi passages together therewith, whereby it is also sucked into the fluid jet streams issuing from the jet nozzles. This material is therefore impelled into the inlet section 72 with all the force of the diluted jet streams and the desired result, whether it be intermixture, chemical reaction or other action, is thereby more easily and effectively obtained.

In FIG. 6 there is illustrated a modified form of the apparatus, generally designated 112, wherein two opposed inlet sections 114 and 116, each similar to section 12, are each provided with a separate nozzle, as at 118 and 120 respectively, which is similar to nozzle 26 and a feed means, as at 122 and 124 respectively, which is similar to feed means 36. Each is also provided with a dispersing nozzle, as at 126 and 128 respectively, similar to nozzle 44. The sections 114 and 116 are integrally connected to a common center area 130 which is defined at its upper portion by a bulge 132. Extending downwardly from the common area 130 is a common downstack 134 into which the fluid and particles from both of the inlet sections 114 and 116 pass. At this portion of the apparatus, the fluid and particles may thoroughly intermix.

Leading from the common downstack 134 are two opposed arcuate treating sections respectively designated 136 and 138. A plurality of tangentially-arranged fluid nozzles 140 lead into the arcuate section 136 while a plurality of similar fluid nozzles 142 lead tangentially into the arcuate section 138. Both sets of nozzles are connected to a source of preferably low but, if desired, high pressure elastic fluid (not shown).

The arcuate sections 136 and 138 merge into respective classifier sections 144 and 146 from which lead exhaust stacks respectively designated 148 and 150. Each classifier section leads into a return section, as at 152 and 154 respectively. All the sections except inlet sections 114 and 116 are circular in cross-section.

In the operation of the apparatus of FIG. 6, two separate materials may be inserted, one through the feed inlet 122 and the other through the feed inlet 124. Both substances are then pre-dried by the gases from the respective nozzles 118 and 120 and, while still retaining some moisture, are intermixed in the area 130. The bulge 132 is used to provide sufficient space to accommodate the mixture of both materials.

The slight amount of moisture still clinging to the pre-dried particles helps to form an adherent between them. The drying of the mixture is then substantially completed as it passes through the downstack 134.

When the mixture reaches the bottom of the downstack 134, one part passes through the section 136 and the other through the section 138. In these two sections, the particles are subjected to the turbulence of the gases entering through the nozzles 140 and 142 and impinge against each other to effect a peeling action on each other whereby the outer shell is cracked and then peeled off to expose the inner portions of the particles. The broken or, in some instances, pulverized particles are impelled by centrifugal force through the classifier sections, the lighter particles being entrained by the fluid vortex formed by the tangential nozzles 140 and 142 and exhausted to a collection station through stacks 148 and 150. The heavier particles are centrifugally propelled back through the return sections into the respective inlet sections 114 and 116 from where they are recycled back into downstack 134.

It is also within the scope of the present invention to use three or more inlet sections meeting at a common downstack.

Figure 7:
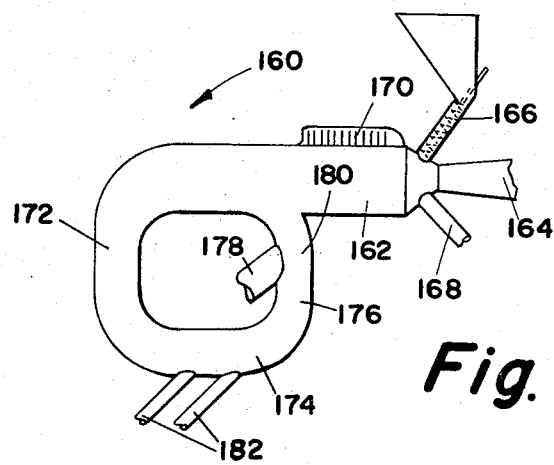
FIG. 7 is a side elevational view of a further form of the invention.

In FIG. 7 there is shown a modification of the invention wherein the apparatus, generally designated 160, comprises an inlet section 162 similar to that shown at 12. This inlet section is also provided with a nozzle 164 at its rear end, similar to nozzle 26, and with a feed means 166. This feed means 166 is illustrated as being of the screw-feed type but any other feasible type may be used. A dispersing nozzle 168, similar to nozzle 44, is also optionally provided.

Instead of using high temperature gases to dry the granular material, radiant heat is used. This radiant heat is supplied by an electrical heating means 170, connected to a source of electrical energy (not shown). The heating means 170 is provided in a housing on the upper portion of the inlet section 162 and in the straight parts thereof.

The inlet section 162 merges into a downstack 172 which, in turn, merges into arcuate treating area 174 from which extends classifier section 176, provided with an exhaust stack 178, and merging with a return section 180. A plurality of tangential nozzles 182 lead into the bottom of the section 174 from a source of pressure fluid (not shown). All the sections except inlet section 162 are circular in cross-section.

The operation of the apparatus shown in FIG. 7 is similar to that of the apparatus of FIG. 6 except that only one material is treated and the radiant heat replaces the hot gases.

Obviously, many modifications of the present invention are possible in the light of the above teachings. It is, therefore, to be understood that within the scope of the appended claims, the invention may be practiced otherwise than as specifically described.

The invention claimed is:

1. Apparatus for treating solid granular material comprising a straight elongated inlet chamber, feed means for feeding wet granular material into said inlet chamber, means for initially heating said material as it passes into said inlet chamber to a temperature sufficient to substantially evaporate liquid adhering to said material, fluid inlet means in said inlet chamber, said fluid inlet means being connected to a source of fluid under pressure for entraining and impelling said material in granular form through said inlet chamber, recycling means for passing said material and its entraining fluid through an arcuate path, means for separating the wetter heavier particles of said material from the drier lighter particles while passing along said path, and means for returning fluid and said heavier particles to said inlet chamber at a position spaced from said feed means longitudinally of said inlet chamber.

2. The apparatus of claim 1 wherein said means for initially heating said material is a fluid inlet nozzle at one end of said inlet chamber, and means for injecting hot elastic fluid under pressure through said nozzle in the longitudinal direction of said inlet chamber, said nozzle being spaced from the inlet end of said recycling means by said inlet chamber.

3. The apparatus of claim 1 wherein said means for initially heating said material comprises a combustion chamber having fluid inlet means at one end of said inlet chamber, said fluid inlet means being constructed and arranged to inject the hot gases of combustion into said inlet chamber in the longitudinal direction thereof, said fluid inlet means being spaced from the inlet end of said recycling means by said inlet chamber.

4. The apparatus of claim 1 wherein said means for initially heating said material comprises a radiant heat emitter.

5. The apparatus of claim 1 wherein said feed means includes a rotary valve having at least one blade, and at least one fluid jet nozzle operatively connected to said valve for applying jets of cleaning fluid to said valve blade as it rotates.

6. The apparatus of claim 1 wherein there are at least two inlet chambers meeting at a common area, each inlet chamber having its individual feed means and means for initially heating said material, a common entrance portion into said recycling means extending from common area, and individual arcuate duct means leading from said common entrance portion back to their individual corresponding inlet chambers, each of said arcuate duct means having means for separating the heavier particles from the drier particles and for returning the heavier particles and fluid to the corresponding inlet chamber.

7. The apparatus of claim 1 wherein said fluid inlet means includes at least one tangential nozzle tangentially positioned relative to said inlet chamber and in fluid communication with the interior of said inlet chamber.

8. The apparatus of claim 1 wherein said fluid inlet means includes at least one tangential nozzle in fluid communication with a combustion chamber and in tangential fluid communication with the interior of said inlet chamber.

9. The apparatus of claim 1 wherein said fluid inlet means includes at least one tangential nozzle in fluid communication with a combustion chamber and in tangential fluid communication with the interior of said inlet chamber, said tangential nozzle being encompassed by a Venturi passage leading from a source of fluid into said inlet chamber.

References Cited
UNITED STATES PATENTS

| | | | |
|---|---|---|---|
| 2,284,746 | 6/1942 | Kidwell | 34—57 X |
| 2,297,726 | 10/1942 | Stephanoff | 34—10 |
| 2,413,420 | 12/1946 | Stephanoff | 34—10 |
| 2,933,208 | 5/1960 | Green | 214—17.68 |
| 3,202,646 | 2/1962 | Joseph et al. | 34—10 |

FREDERICK L. MATTESON, JR., *Primary Examiner.*

JOHN J. CAMBY, *Examiner.*